United States Patent [19]

Inagawa et al.

[11] Patent Number: 5,445,441
[45] Date of Patent: Aug. 29, 1995

[54] FLUID PRESSURE BOOSTING TYPE BRAKE SYSTEM

[75] Inventors: Shinichi Inagawa; Shohei Matsuda, both of Wako, Japan

[73] Assignee: Honda Giken Kogyo Kabushiki Kaisha, Tokyo, Japan

[21] Appl. No.: 208,263

[22] Filed: Mar. 9, 1994

[30] Foreign Application Priority Data

Apr. 14, 1993 [JP] Japan ................................ 5-087609

[51] Int. Cl.6 .......................................... B60T 13/16
[52] U.S. Cl. .................................. 303/10; 303/113.4
[58] Field of Search ............. 303/3, 10, 15, 20, 113.4, 303/11; 364/426.01

[56] References Cited

U.S. PATENT DOCUMENTS

| | | | |
|---|---|---|---|
| 3,790,225 | 2/1974 | Wehde | 303/113.4 |
| 5,106,167 | 4/1992 | Matsuda | 303/15 |
| 5,186,524 | 2/1993 | Burgdorf et al. | 303/113.4 X |
| 5,322,352 | 6/1994 | Ohno et al. | 303/3 |

FOREIGN PATENT DOCUMENTS 4-274958  9/1992  Japan.
4-345568  12/1992  Japan.

*Primary Examiner*—Robert J. Oberleitner
*Assistant Examiner*—Lee W. Young
*Attorney, Agent, or Firm*—Armstrong, Westerman, Hattori, McLeland & Naughton

[57] ABSTRACT

A fluid pressure boosting type brake system includes a fluid pressure source including a fluid pump and a pressure tank connected to the pump, and a control valve capable of controlling the output pressure from the fluid pressure source to a fluid pressure corresponding to the degree of brake operation to output it. In this brake system, the fluid pump can be driven in accordance with the consumption of fluid pressure in a brake device, thereby insuring a reliable sufficient fluid pressure in the fluid pressure source.

3 Claims, 12 Drawing Sheets

FIG.11
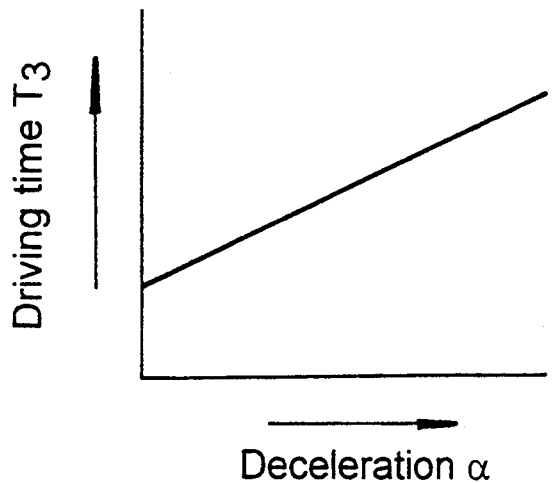
FIG.12(a)
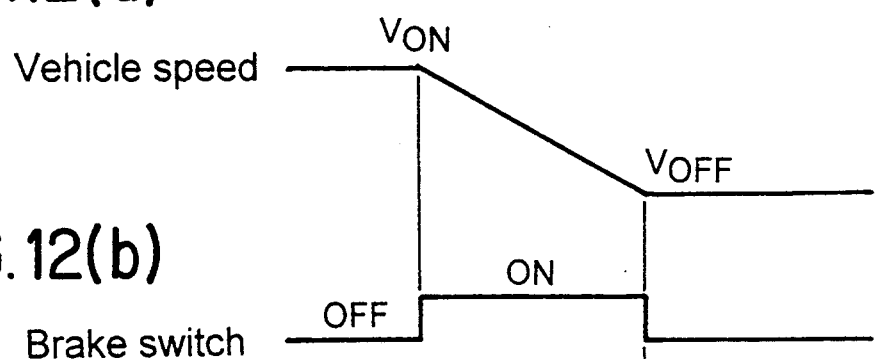
FIG.12(b)
FIG.12(c)
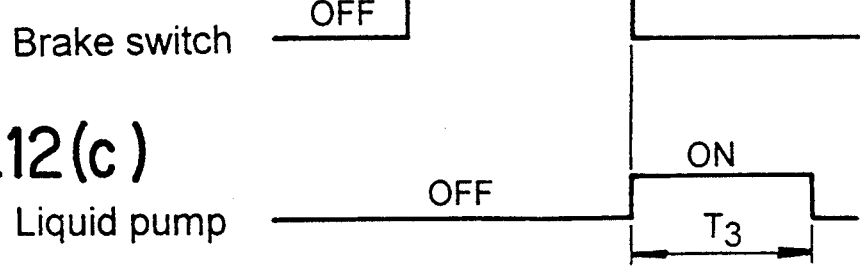

FIG.13
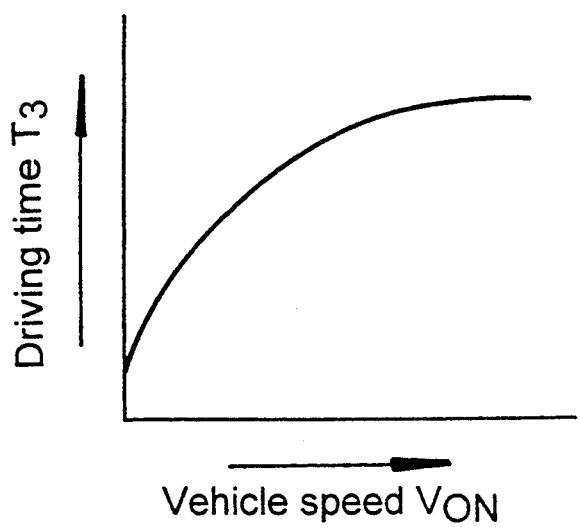
FIG.14(a)
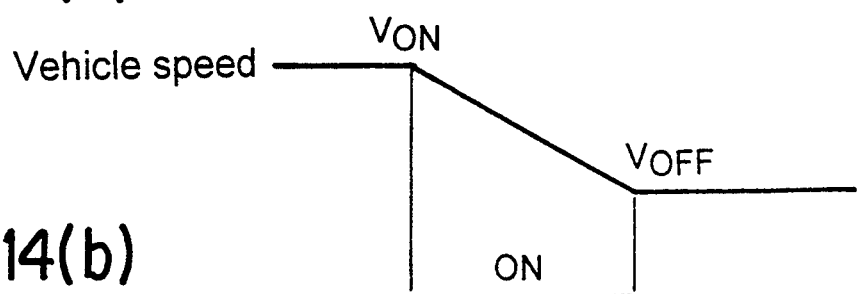
FIG.14(b)
FIG.14(c)

FLUID PRESSURE BOOSTING TYPE BRAKE SYSTEM

BACKGROUND OF THE INVENTION

1. Field of the Invention

The present invention relates to a fluid pressure boosting type brake system comprising a fluid pressure source including a fluid pump and a pressure tank connected to the pump, and a control valve capable of controlling an output pressure from the fluid pressure source to a fluid pressure corresponding to a degree brake of operation to output the same.

2. Description of the Related Art

Such brake systems are already known, for example, from Japanese Patent Application Laid-open Nos. 274958/92 and 345568/92.

In the brake system disclosed in Japanese Patent Application Laid-open No. 274958/92, the operation of the fluid pump is controlled by a pressure switch which is turned ON, when the fluid pressure in the pressure tank becomes equal to or less than a predetermined value. Therefore, when the pressure switch malfunctions, the fluid pump may not be operated, resulting in a reduction in brake assisting force. In the brake system disclosed in Japanese Patent Application Laid-open No. 345568/92, the fluid pressure in the pressure tank is detected by a pressure sensor in addition to the pressure switch, thereby judging whether or not the pressure switch is normal. However, if a circuit for controlling the operation of the fluid pump, under reception of the detection values detected by the pressure switch and the pressure sensor, malfunctions, then the fluid pump may fail to be operated, resulting in a reduction in brake assisting force.

SUMMARY OF THE INVENTION

Accordingly, it is an object of the present invention to provide a fluid pressure boosting type brake system, in which the fluid pump can be driven in accordance with the consumption of a fluid pressure in a brake device to reliably insure a sufficient fluid pressure in the fluid pressure source.

To achieve the above object, the brake system according to the present invention comprises a fluid pressure source including a fluid pump and a pressure tank connected to the pump, and a control valve capable of controlling an output pressure from the fluid pressure source to a fluid pressure corresponding to the degree of brake operation to output the same, wherein the system further includes a brake operation detecting means for detecting a brake operation, and a consumed-pressure correspondence driving means for outputting a driving signal indicative of a command to drive the fluid pump for each preset time for a predetermined period, while the brake operation is detected by the brake operation detecting means.

With the above arrangement, the fluid pump is driven in an ON/OFF-repeated manner in accordance with the consumption of fluid pressure corresponding to the brake operation. Thus, even if the pressure detector is not provided, or even if a pressure detector gets out of order, the fluid pressure pump can be driven to reliably insure a sufficient fluid pressure in the fluid pressure source.

The brake system according to the present invention, further including a pressure detector for detecting a fluid pressure in the pressure tank, a detected-pressure correspondence driving means provided in parallel to the consumed-pressure correspondence driving means and capable of outputting a driving signal indicative of a command to drive the fluid pump in accordance with a detection value detected by the pressure detector, and a prohibiting-signal outputting means for outputting a prohibiting signal indicative of a command to prohibit the output of the driving signal from the consumed-pressure correspondence driving means in a state in which the detected-pressure correspondence driving means can output the driving signal.

With the above arrangement, if the control based on the detection value detected by the pressure detector is made impossible, then the fluid pump can be driven, while being suppressed in frequency of operation in accordance with the consumption of fluid pressure, thereby enhancing the reliability for supply of the fluid pressure.

The brake system, in addition, includes power circuits individually connected to the consumed-pressure correspondence driving means and the degree-of detected pressure correspondence driving means, respectively.

With the above arrangement, a completely double redundant circuit can be configured to further enhance the reliability.

In the brake system, there is provided a fluid pressure boosting brake system, comprising a fluid pressure source, including a fluid pump and an accumulator connected to the pump, and a control valve capable of controlling an output pressure from the fluid pressure source to a fluid pressure, corresponding to a brake operation quantity, to output the same, wherein the brake system further includes brake operation detecting means for detecting a brake operation, a motion parameter detecting means for detecting a longitudinal motion parameter of a vehicle, and a driving means capable of outputting a driving signal indicative of a command to drive the fluid pump for a time determined on the basis of the motion parameter during braking.

With the above arrangement, the fluid pump is driven in accordance with the consumption of fluid pressure corresponding to the brake operation. Thus, even if a pressure detector is not provided, or even if a pressure detector is provided and gets out of order, the fluid pressure can be driven to reliably insure a sufficient fluid pressure in the fluid pressure source.

The brake system further includes a pressure detector for detecting a fluid pressure in the pressure tank, and a normal-state detecting means for detecting the pressure detector being in a normal state, the driving means being arranged such that the following two states 1) and 2) can be switched over: a state 1) in which the driving means outputs the driving signal indicative of a command to drive the fluid pump for a time determined on the basis of the motion parameter during braking, when the pressure detector is in an abnormal state, and a state 2) in which the driving means outputs the driving signal indicative of a command to drive the fluid pump on the basis of a detection value detected by the pressure detector, when the pressure detector is in a normal state.

With the above arrangement, if the control based on the detection value detected by the pressure detector becomes impossible, due to a trouble of the pressure detector, the fluid pump can be driven in accordance with the consumption of fluid pressure to provide an enhanced reliability for supply of the fluid pressure.

The above and other objects, features and advantages of the invention will become apparent from the following description of preferred embodiments, taken in conjunction with the accompanying drawings.

BRIEF DESCRIPTION OF THE DRAWINGS

FIG. 11 is a map in which the pump driving time is determined in accordance with the deceleration;

FIG. 12 is a timing chart for driving the pump;

FIG. 13 is a map in which the pump driving time is determined in accordance with the vehicle speed in a modification to the second embodiment; and FIG. 14 is a timing chart for driving the pump.

DESCRIPTION OF THE PREFERRED EMBODIMENTS

A first embodiment of the present invention applied to a liquid pressure boosting type brake system in a vehicle will now be described in connection with FIGS. 1 to 9.

Figure 1:
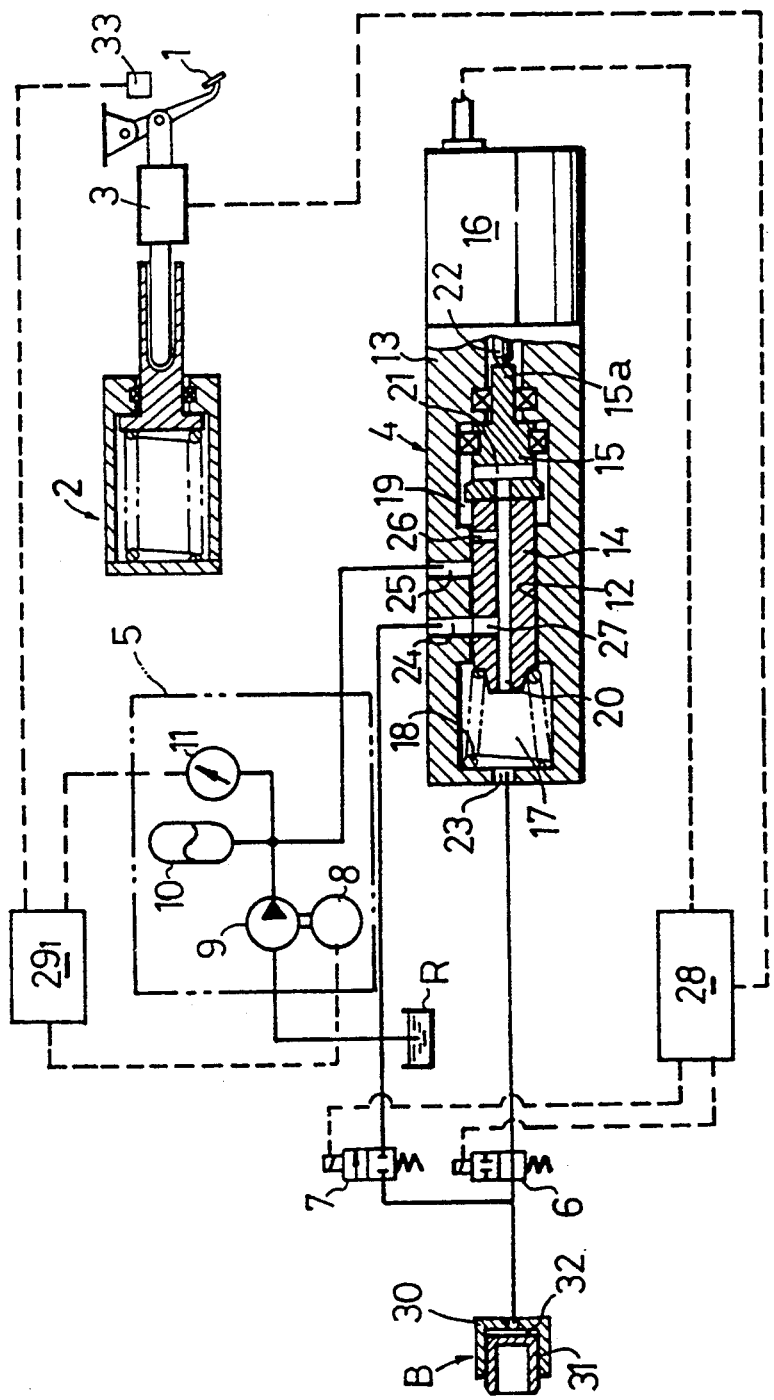
FIG. 1 is a diagram illustrating a liquid pressure boosting type brake system according to a first embodiment of the present invention.

Referring first to FIG. 1, a reaction force generating means 2, for exhibiting a spring force opposing a depression force on a brake pedal 1, is connected to the brake pedal 1 through a depression force sensor 3 for detecting the brake-operation oparation. During normal braking, the output pressure from a liquid pressure source 5, as a fluid pressure source, is controlled by a control valve 4 in accordance with the degree of brake-operation detected by the depression force sensor 3, and an output liquid pressure, from the control valve 4, is applied to a wheel brake B. A braking liquid pressure of the wheel brake B can be also maintained, or controlled, by a normally-opened type solenoid inlet valve 6 and a normally-closed type solenoid outlet valve 7 which are provided, in correspondence to the wheel brake B, to effect an anti-lock control.

The liquid pressure source 5 includes a liquid pump 9, as a fluid pressure pump driven by a motor 8, to pump a working liquid from a reservoir R, a pressure tank 10 (an accumulator in this embodiment) connected to the liquid pump 9, and a pressure detector 11 for detecting a liquid pressure accumulated in the accumulator 10.

The control valve 4 includes a housing 13, having a cylinder bore 12 closed at its axially one end, a spool 14, slidably received in the cylinder bore 12, a reaction piston 15, slidably received in the cylinder bore 12, while abutting against the spool 14, and a linear solenoid 16 mounted to a side surface of the axially other end of the housing 13 to exhibit a driving force for urging the reaction piston 15 in one axial direction thereof.

An output chamber 17 is defined between one end of the spool 14 and one end wall of the cylinder bore 12, and a spring 18 is accommodated in the output chamber 17 for biasing the spool 14 in the other axial direction.

An annular output pressure working chamber 19 is defined by an inner surface of the cylinder bore 12, the spool 14 and the reaction piston 15. The chamber 19 faces a front surface of the reaction piston 15. A communication passage 20 is provided in the spool 14, over the axially entire length thereof, to lead to the output chamber 17, and a communication hole 21 is provided in the reaction piston 15 for permitting communication of the communication passage 20 with the output pressure working chamber 19. A liquid pressure force is applied to the reaction piston 15 in the other axial direction (i.e., rightwardly as viewed in FIG. 1) by a liquid pressure in the output pressure working chamber 19 leading to the output chamber 17, so that the spool 14 is moved to follow the reaction piston 15 by a spring force of the spring 18.

The linear solenoid 16 moves a driving rod 22 axially by a thrust corresponding to an applied quantity of electricity, so that the driving rod 22 coaxially abuts against a piston rod 15a integrally provided on the reaction piston 15. Thus, a thrust of the linear solenoid 16 is applied to the spool 14 in the one axial direction, while a liquid pressure force from the output pressure working chamber 19 is applied to the spool 14 in the other axial direction, so that the spool 14 is moved axially by a balance between the thrust and the liquid pressure force.

The housing 13 has an output port 23, a release port 24 and an input port 25 which are provided therein at distances from one another in sequence from one of the axial ends. The output port 23 normally communicates with the output chamber 17, the release port 24 leads to the reservoir R, and the input port 25 leads to the liquid pressure source 5.

The spool 14 is provided with a first valve bore 26 capable of permitting the communication between the input port 25 and the communication passage 20, and with a second valve bore 27 capable of permitting the communication between the release port 24 and the communication passage 20. The arrangement of the valve bores 26 and 27 is determined such that when the spool 14 has been moved in one of its axial directions, the first valve bore 26 is in a state in which it permits communication between the input port 25 and the communication passage 20, whereas when the spool 14 has been moved in the other axial direction, the second valve bore 27 is in a state in which it permits communication between the release port 24 and the communication passage 20.

The wheel brake B includes a cylinder 30 and a braking piston 31 slidably received in the cylinder 30, so that a braking force, exhibited by the movement of the braking force 31, corresponds to a liquid pressure applied to braking liquid pressure chamber 32 between cylinder 30 and braking piston 31.

The normally-opened type solenoid inlet valve 6 is interposed between the braking liquid pressure chamber 32 in the wheel brake B and the output port 23 in the control valve 4. The normally-closed type solenoid outlet valve 7 is interposed between the reservoir R and the braking liquid pressure chamber 32 in the wheel brake B.

The operation of the control valve 4, i.e., the quantity of electricity applied to the linear solenoid 16 is controlled by liquid pressure control unit 28 in accordance with the degree of brake operation detected by the depression force sensor 3. The switch-over of the energization and deenergization of the normally-opened type solenoid inlet valve 6 and the normally-closed type solenoid outlet valve 7 is also controlled by liquid pressure control unit 28.

The operation of the liquid pump 9, in liquid pressure source 5, i.e., the operation of the motor 8, is controlled by a pump operation control unit $29_1$. A brake switch 33 serving as a brake-operation detecting means for detecting the braking operation, i.e., the operation of the brake pedal 1 and the pressure detector 11, in the liquid pressure source 5, are connected to the pump operation control unit $29_1$.

Figure 2:
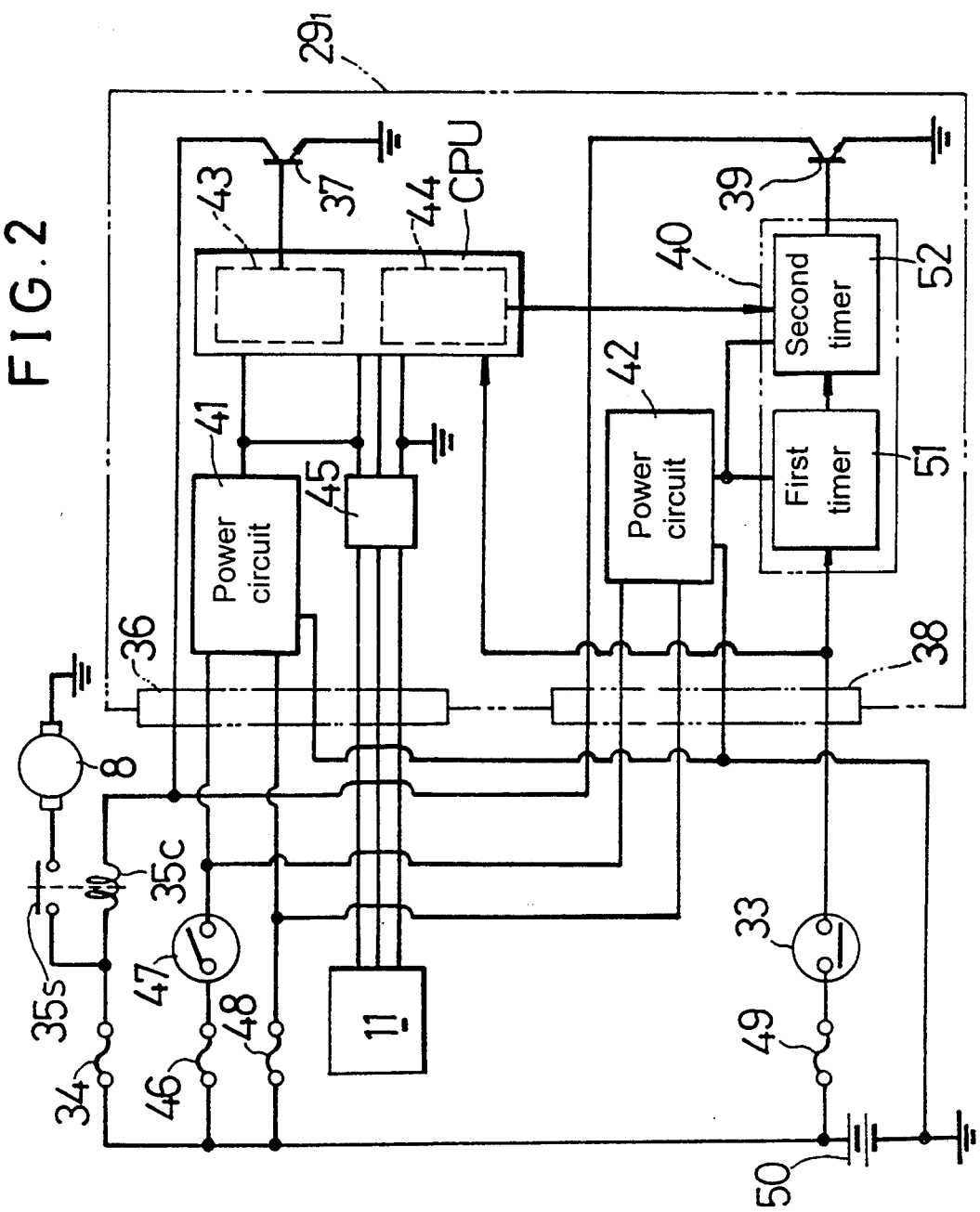
FIG. 2 is a diagram of an arrangement of a pump-operation control unit.

Referring to FIG. 2, the motor 8, for driving the liquid pump 9, is connected to a power source 50 through a relay switch 35s and a fuse 34. A relay coil 35c, constituting a relay together with the relay switch 35s, is also connected to the power source 50 through the fuse 34. When the relay coil 35c is energized, the motor 8 is operated. When the relay coil 35c is deenergized, the operation of the motor 8 is stopped.

The energization and deenergization of the relay coil 35c are controlled by the pump-operation control unit $29_1$. The pump-operation control unit $29_1$ includes a transistor 37 connected to the relay coil 35c, through a connector 36, a central processing unit CPU, for controlling the ON-OFF of the transistor 37, a transistor 39 connected to the relay coil 35c, through a connector 38, a consumed-pressure correspondence drive means 40 for controlling the ON-OFF of the transistor 39, and power circuits 41 and 42, individually connected to the central processing unit CPU and the consumed-pressure correspondence drive means 40.

The central processing unit CPU has a processing function, as a detected-pressure correspondence drive means 43, for controlling the ON-OFF of the transistor 37 to output a driving signal indicative of a command to drive the liquid pump 9 in accordance with a detection value detected by the pressure detector 11, and a processing function, as a prohibiting signal generating means 44, for generating a prohibiting low-level signal, indicative of a command to prohibit the output of the driving signal from the consumed-pressure correspondence drive means 40, when the detected-pressure correspondence drive means 43 is in a state capable of outputting the driving signal. A detection signal, from the pressure detector 11, is supplied through the connector 36 and via a filter/buffer 45 to the central processing unit CPU, and the brake switch 33, connected to the power source 50 through the fuse 49, is connected to the central processing unit CPU through the connector 38. The power source 50 is connected to the power circuit 41 through the fuse 46, an ignition switch 47 and the connector 36, and the power source 50 is also connected to the power circuit 41 through the fuse 48 and the connector 36.

The prohibiting signal generating means 44 outputs the prohibiting low-level signal to the consumed-pressure correspondence drive means 40, when the detected-pressure correspondence drive means 43 is in the state capable of outputting the driving signal, i.e., in a state in which there are no trouble of the power circuit 41 and no trouble of the pressure detector 11. In the prohibiting signal generating means 44, the trouble of the pressure detector 11 is detected by a procedure which will be described below.

Figure 3:
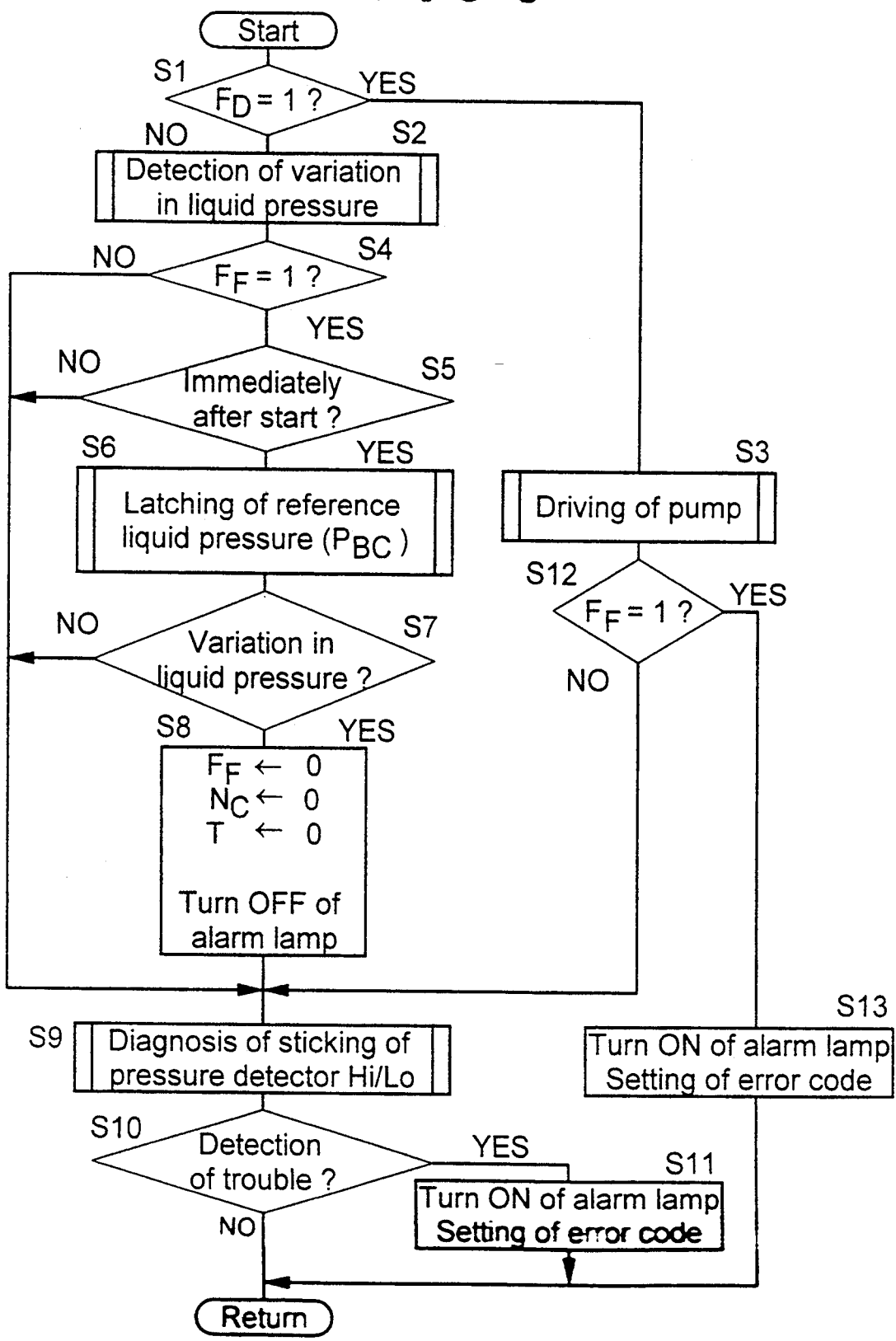
FIG. 3 is a flow chart illustrating a main routine for judgement of a trouble of a pressure detector.

As shown in FIG. 3, at a first step S1, it is judged whether or not a flag $F_D$ is equal to "1". The flag $F_D$ is intended to demand the driving of the liquid pump 9 irrespective of the detection value detected by the pressure detector 11 in detecting the trouble of the pressure detector 11. The flag $F_D$ equal to "1" indicates a state in which the driving of the liquid pump 9 is demanded. If $F_D=0$, the processing is advanced to a second step S2. On the other hand, if $F_D=1$, the processing is advanced to a third step S3.

Figure 4:
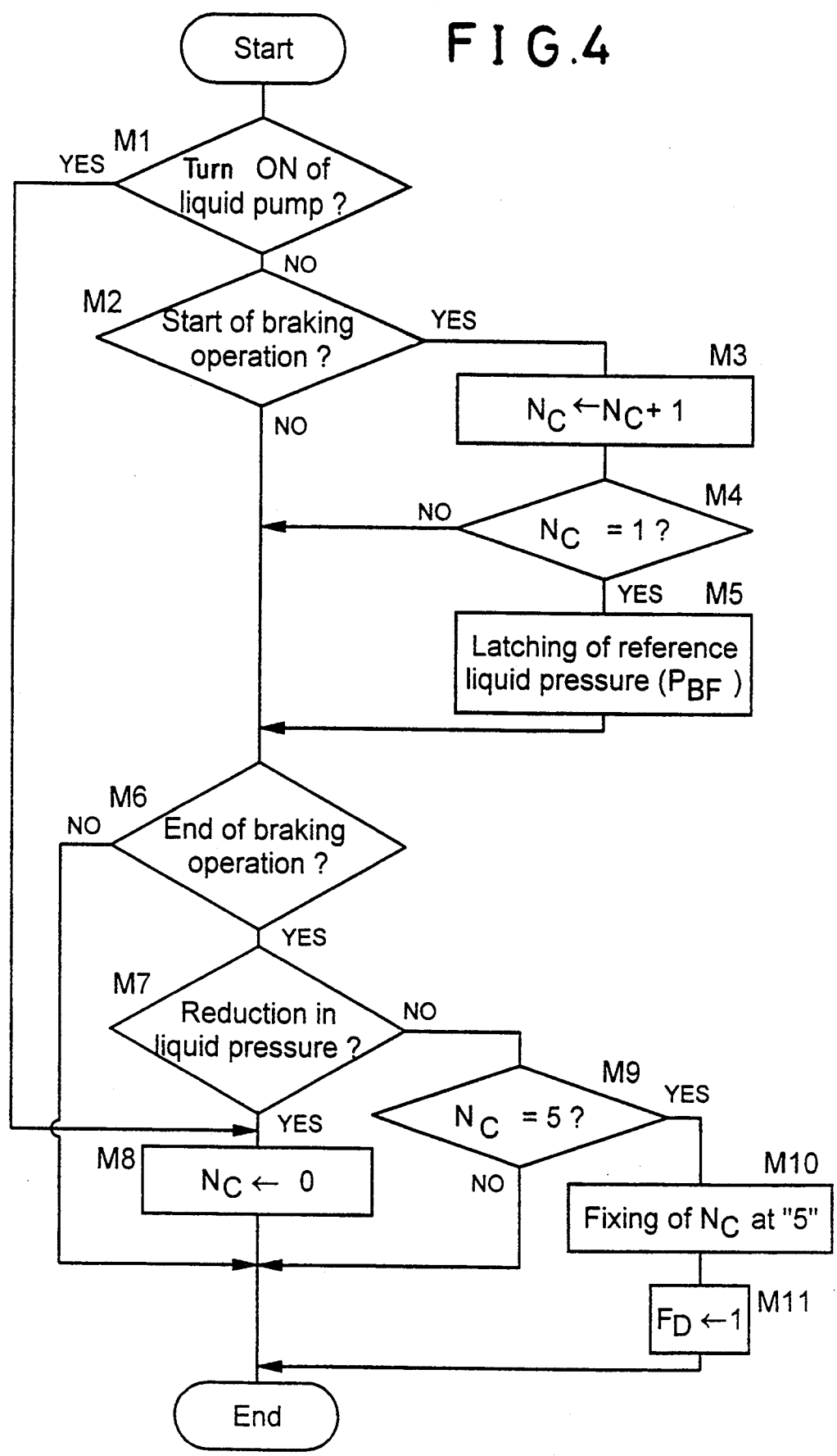
FIG. 4 is a flow chart illustrating a sub-routine for detection of a variation in liquid pressure.

At the second step S2, a variation in liquid pressure is detected according to a sub-routine shown in FIG. 4. At a first sept M1 in this sub-routine, it is judged, on the basis of the driving signal from the detected-pressure correspondence drive means 43, whether or not the liquid pump 9 is in operation. If it is decide(that the liquid pump 9 is in operation, the count value $N_C$ of a counter is set at "0" at an eighth step M8. This counter counts the number of braking operations.

If it is decided at the first step M1 that the liquid pump 9 is out of operation, the processing is advanced to a second step M2, where it is judged whether or not the braking operation has been started, i.e., whether or not a detection signal from the brake switch 33 has been given. At the start of the braking operation, "1" is added to the count value $N_C$ at a third step M3. If it is decided at a next fourth step M4 that the count value $N_C$ is equal to "1", i.e, that the number of braking operations is one, then the currently detected liquid pressure value is latched as a first reference liquid pressure $P_{BF}$, progressing to a sixth step M6. Even when it is decided at the second step M2 that the braking operation is not started, as well as when it is decided at the fourth step M4 that $N_C \neq 1$, then the processing is advanced to the sixth step M6.

At the sixth step M6, it is judged whether or not the braking operation has been ended, i.e., whether or not the detection signal from the brake switch 33 is fallen. At the end of the braking operation, the processing is advanced to a seventh step M7. It is judged at this seventh step M7 whether or not a decrement of the detected liquid pressure is equal to or more than a predetermined value $\Delta P_1$, e.g., 4 kg/cm². That is, the detected liquid-pressure P, at the end of the braking operation., is compared with the first reference liquid pressure $P_{BF}$ latched at the fifth step M5. If $(P_{BF} 31 P) \geq \Delta P_1$, then the processing is advanced to the eighth step M8, and if $(P_{BF}-P) \geq \Delta P_1$, then the processing is advanced to the ninth step M9.

In the ninth step M9, it is judged whether or not the count value $N_C$ is equal to "5". In $N_C=5$, the count value $N_C$ is fixed at "5" at a tenth step M10, and then, the flag $F_D$ is set at "1" at a 11th step M11.

With such sub-routine shown in FIG. 4, the detected liquid pressure value at the start of the braking operation is stored as the reference liquid pressure PBF during non-operation of the liquid pump 9, and when a state in which the decrement: of the detected liquid pressure value, during continuation of the braking-operation, is lower than the predetermined value $\Delta P_1$, as a result of comparison of the detected liquid pressure P, at the end of the braking operation with the first reference liquid pressure $P_{BF}$, has been continued five times or more, the flag $F_D$, for forcedly driving the liquid pump 9, is set at "1". In other words, when a state in which the variation in output from the pressure detector 11 is lower than the predetermined value $\Delta P_1$, irrespective of the consumption of liquid pressure with the braking operation, has been continued five times or more, the liquid pump 9 is forcedly driven.

Figure 5:
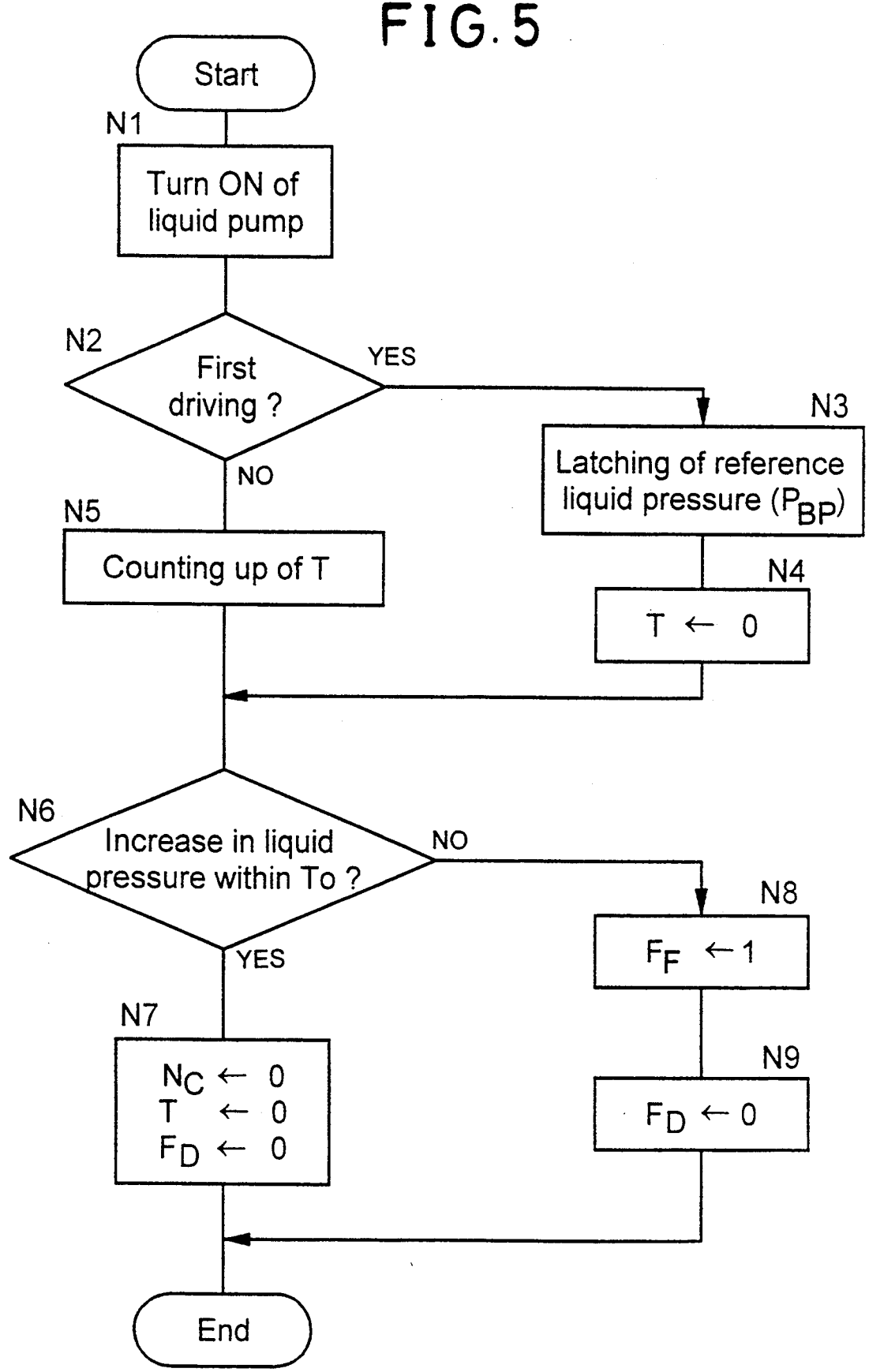
FIG. 5 is a flow chart illustrating a sub-routine for forcedly driving a pump.
Figure 6:
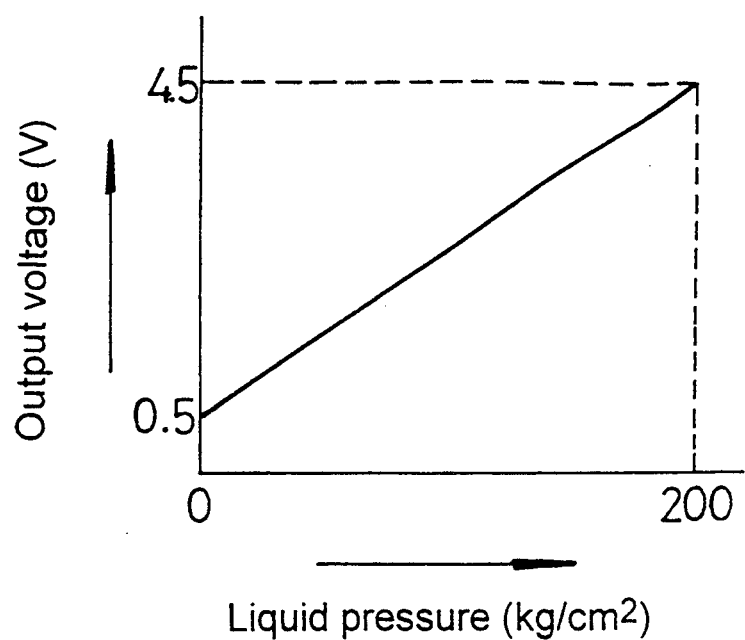
FIG. 6 is a diagram illustrating an output characteristic of the pressure detector.

At the third step S3, in the main routine shown in FIG. 3, a sub-routine shown in FIG. 5 is carried out. At a first step N1 in FIG. 5, the liquid pump 9 is driven irrespective of the detection value detected by the pressure detector 11. At a second step N2, it is judged whether or not the driving of the liquid pump 9 is a first driving. If it is the first driving, the currently detected liquid pressure value is latched as a second reference liquid pressure $P_{BF}$ at a third step N3. At a fourth step N4, a timer for counting the time of driving of the liquid pump 9, when the flag $F_D$ is equal to "1", is reset, progressing to a sixth step N6. If it is decided at the second step N2 that the driving of the liquid pump 9 is a second or more driving, the time T counted by the timer is counted up at a fifth step N5, progressing to the sixth step N6.

At the sixth step N6, it is judged whether or not the detected liquid pressure value has been increased by a second predetermined value $\Delta P_2$, e.g., 4 kg/cm$^2$ or more from the second reference liquid pressure $P_{EP}$, before the time counted by the timer reaches a preset time $T_0$, e.g., 3 seconds. If it is decided that the detected liquid pressure value has been increased by the second predetermined value $\Delta P_2$, or more, within the preset time $T_0$, a counter and the timer are reset, while at the same time, the flag $F_D$ is set at "0", at the seventh step N7.

If it is decided at the sixth step N6 that the variation in detected liquid pressure value P from the second reference liquid pressure $P_{BP}$, within the preset time $T_0$, is less than the second predetermined value $\Delta P_2$, then a flag $F_F$ is set at "1" at an eighth step N8, and the flag $F_D$ is set "0" at a ninth step N9.

With such sub-routine shown in FIG. 5, when the variation in detected liquid pressure value is less than the second predetermined value $\Delta P_2$ within the preset time $T_O$ from the start of the driving of the liquid pump 9, when the liquid pump 9 is being forcedly driven as a result of the flag $F_D$ becoming equal to "1", the flag $F_F$ is set at "1" on the basis of the decision that the pressure detector 11 is out of order, i.e., has a trouble.

Again, in the main routine shown in FIG. 3, it is judged at a fourth step S4 whether or not the flag $F_F$ is equal to "1", after the sub-routine of the second step S2 has been carried out. If $F_F=1$, it is judged at a fifth step S5 whether or not it is immediately after the start, i.e., whether or not it is immediately after the turn-ON of the ignition switch 47. If it is immediately after the start, the processing is advanced to a sixth step S6. If it is decided at the fourth step S4 that $F_F \neq 1$, as well as if it is decided at the fifth step S5 that it is not immediately after the start, the processing is advanced to a ninth step S9.

At the sixth step S6, the detected liquid pressure value, at that time, is latched as a third referenced liquid pressure $P_{BC}$, and at a next seventh step S7, it is judged whether or not the detected liquid pressure value is varied from the third reference liquid pressure $P_{BC}$. If there is a variation in liquid pressure, the flag $F_F$ is set at "0"; the counter and timer are reset and further, an alarm lamp (not shown) turned ON at the start, i.e., at the turn-ON of the ignition switch 47 is turned OFF, all at an eighth step S8. If it is decided at the seventh step S7 that there is no variation in liquid pressure, the processing is advanced to the ninth step S9.

At the ninth step S9, it is diagnosed according to a sub-routine (not shown) whether or not the pressure detector 11 is out of order, i.e., has a trouble, while remaining at a high or low level. The output voltage from the pressure detector 11 is determined so as to read 0.5 V, for example, when the liquid pressure is 0 kg/cm$^2$, and to read 4.5 V, for example, when the liquid pressure is 200 kg/cm$^2$. In this sub-routine, if the output voltage from the pressure detector 11 is less than 0.5 V or exceeds 4.5 V, then it is diagnosed that the pressure detector 11 is out of order. If it is decided at a tenth step S10 that the trouble has been detected, then the alarm lamp is turned ON and at the same time, an error code indicating that the pressure detection 11 is out of order in a high or low level sticking state is set at an 11th step S11. This error code is not eliminated even by the turn-OFF of the ignition switch 47.

After the sub-routine of the third step S3 has been carried out, it is judged at a 12th step S12 whether or not the flag $F_F$ is equal to "1". If $F_F \neq 1$, the processing is advanced to the ninth step S9. On the other hand, if $F_F=1$, the alarm lamp is turned ON and at the same time, an error code indicating that the pressure detector 11 is out of order, including the fact that the flag $F_F$ is equal to "1", is set at a 13th step S13. This error code is not eliminated even by the turn-OFF of the ignition switch 47.

Figure 7:
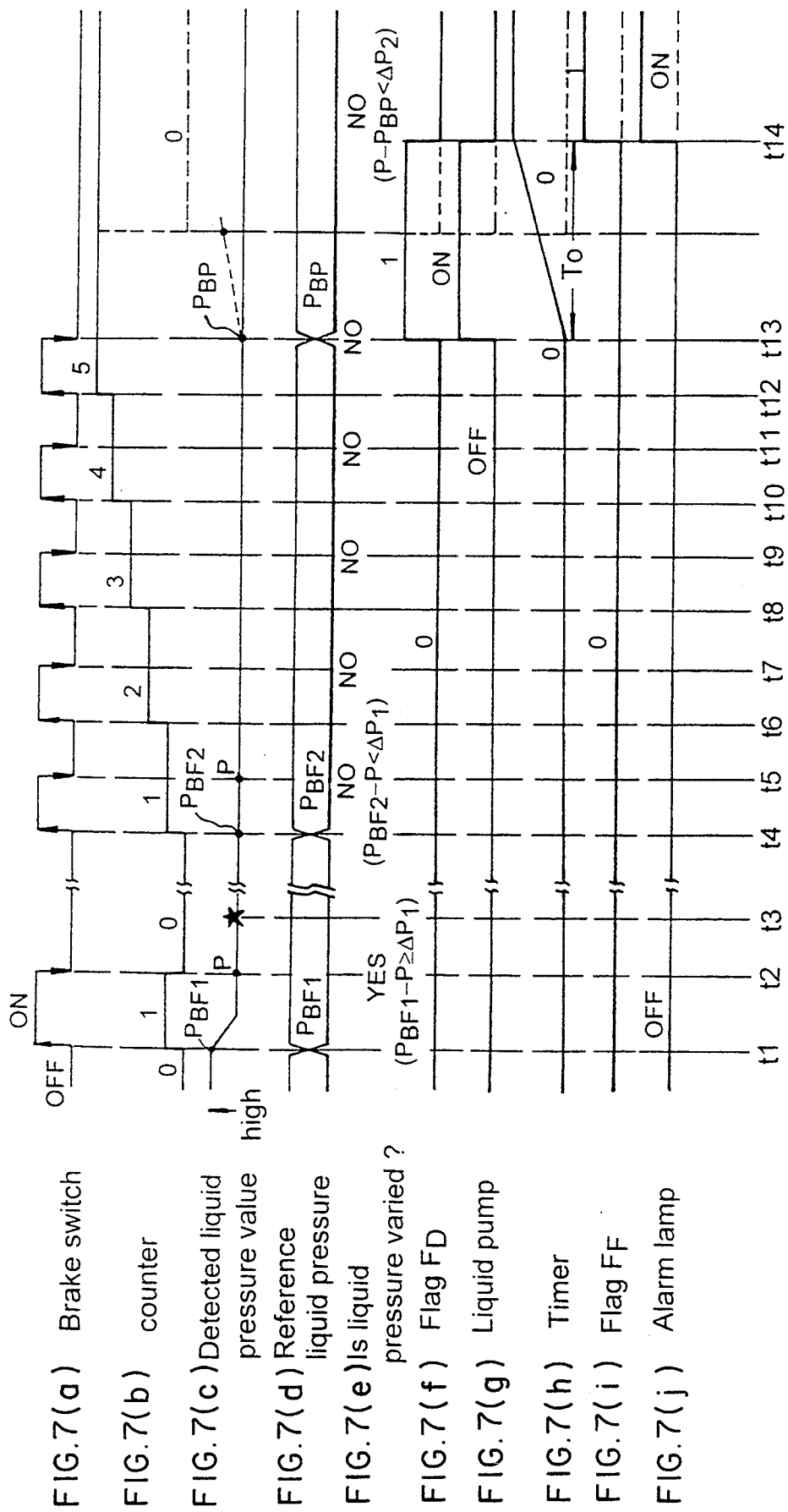
FIG. 7 is a timing chart for judgement of a trouble of the pressure detector.

A timing chart according to such a procedure of detecting the trouble of the pressure detector 11 is as shown in FIG. 7. Before the pressure detector 11 gets out of order, the currently detected liquid pressure value is latched as a first reference liquid pressure $P_{BF1}$ at a time point of the start of the braking operation, i.e., at a time point $t_1$ when an output signal from the brake switch 33 is risen. The detected liquid pressure value P, at a time point of the end of the braking operation, i.e., at a time point $t_2$ when the output signal from the brake switch 33 is fallen, is compared with the first reference liquid pressure $P_{BF1}$. From the fact that $P_{BF1} - P > \Delta P_1$, it is decided that there is a variation in liquid pressure.

Then, if the pressure detector 11 gets out of order at a time point $t_3$, the currently detected liquid pressure value is latched as a first reference liquid pressure $P_{BF2}$ at a time point $t_4$ of the braking operation after the time point $t_3$. Then, the detected liquid pressure value P is compared with the first reference liquid pressure $P_{BF2}$ at a time point $t_5$ of the end of the braking operation. If $P_{BF2} - P < \Delta P_1$, the count number Nc in the counter is equal to "1". Five braking operations all told are carried out between the time points $t_4$ and $t_{13}$. If it is decided that all the results of comparison of the liquid pressures at time points $t_5$, $t_7$, $t_9$, $t_{11}$ and $t_{13}$ of the ends of the braking operations are $(P_{BF2} - P < \Delta P_1)$ and that there is no variation in liquid pressure, i.e., if the count number Nc in the counter reaches "5" the flag $F_D$ is equal to "1", and the forced driving of the liquid pump 9 is started, while at the same time, the currently detected liquid pressure value is latched as a second reference liquid pressure $P_{BP}$, and the counting in the timer is started.

Thereafter, if the variation in detected liquid pressure value P is less than a second predetermined value $\Delta P_2$, even at a time point $t_{14}$ after a lapse of the preset time $T_0$ from the start of the forced driving of the liquid pump 9, the flag $F_d$ is set at "0", and the forced driving of the liquid pump 9 is stopped, while at the same time, the flag $F_F$ is set at "1", and the alarm lamp is turned ON. When the detected liquid pressure value P is increased to a level equal to or more than the second predetermined value $\Delta P_2$, as shown by a dashed line in FIG. 7, before a lapse of the preset time $T_0$, the driving of the liquid pump 9 is stopped at that time point, while at the same time, the counting in the timer is stopped, and the flag $F_F$ remains equal to "0", i.e., the alarm lamp is not turned ON.

Figure 8:
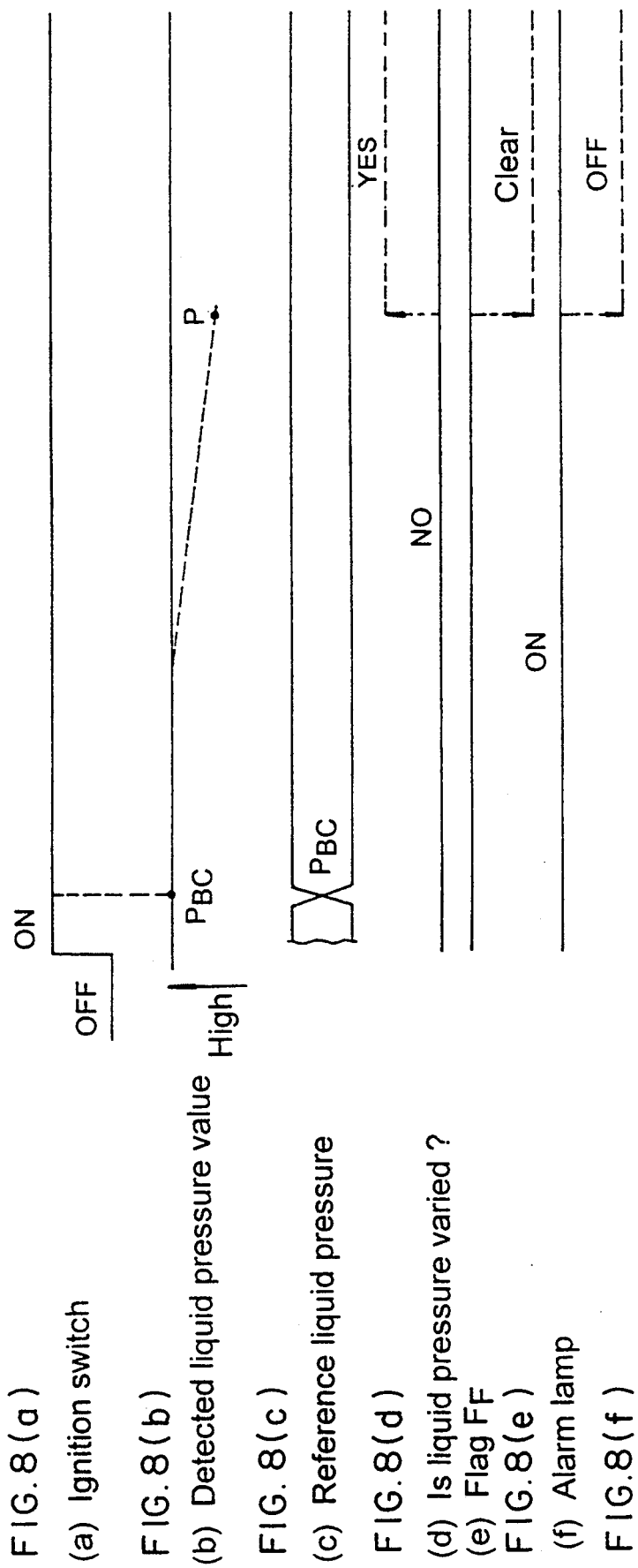
FIG. 8 is a timing chart for judgement of a trouble of the pressure detector at the restart after the judgement of the trouble.

At the restart, after the judgment of the trouble, the flag $F_F$ remains equal to "1", if the detected liquid pressure value P is not varied relative to a third reference liquid pressure $PB_C$, as shown in FIG. 8, immediately after such restart, i.e., immediately after the turn-ON of the ignition switch 47. On the other hand, when the detected liquid pressure value P is varied, as shown by a dashed line in FIG. 8, the flag $F_F$ is set at "0" at that time point, and correspondingly, the alarm lamp is turned OFF.

Referring again to FIG. 2, the consumed-pressure correspondence driving means 40 includes a first timer circuit 51 to which a signal from the brake switch 33 is applied through the connector 38 and which is connected to the power circuit 42, and a second timer circuit 52 to which a signal from the first timer circuit 51 is applied and which is connected to the power circuit 42. The transistor 39 is turned ON in response to an output signal from the second timer circuit 52 brought into a high level, and a prohibiting signal outputted from the prohibiting signal generating means 44 is applied to the second timer circuit 52.

The power source 50 is connected to the power circuit 42 through the fuse 46, the ignition switch 47 and the connector 38 and also through the fuse 48 and the connector 38.

The first timer circuit 51 repeatedly outputs a high level signal at a predetermined period $T_1$ during the braking operation, i.e., during the turn-ON of the brake switch 33. The second timer circuit 52 outputs a signal which is sustained at a high level for a preset time $T_2$, in response to the reception of the high level signal from the first timer circuit 51 in a state in which no low level prohibiting signal is received thereinto from the prohibiting signal generating means 44, i.e., in a state in which a signal received thereinto from the prohibiting signal generating means 44 is of a high level. The preset time $T_2$ is set shorter than the period $T_1$ ($T_2 < T_1$).

Therefore, in a state in which no low level prohibiting signal is outputted from the prohibiting signal generating means 44, a high level driving signal, sustained for the preset time $T_2$, is outputted at the predetermined period $T_1$ during the braking operation, thereby allowing the transistor 39 to be repeatedly turned ON and OFF, so that the motor 8 and, thus, the liquid pump 9 may be operated in an ON/OFF-repeated manner.

Figure 9:
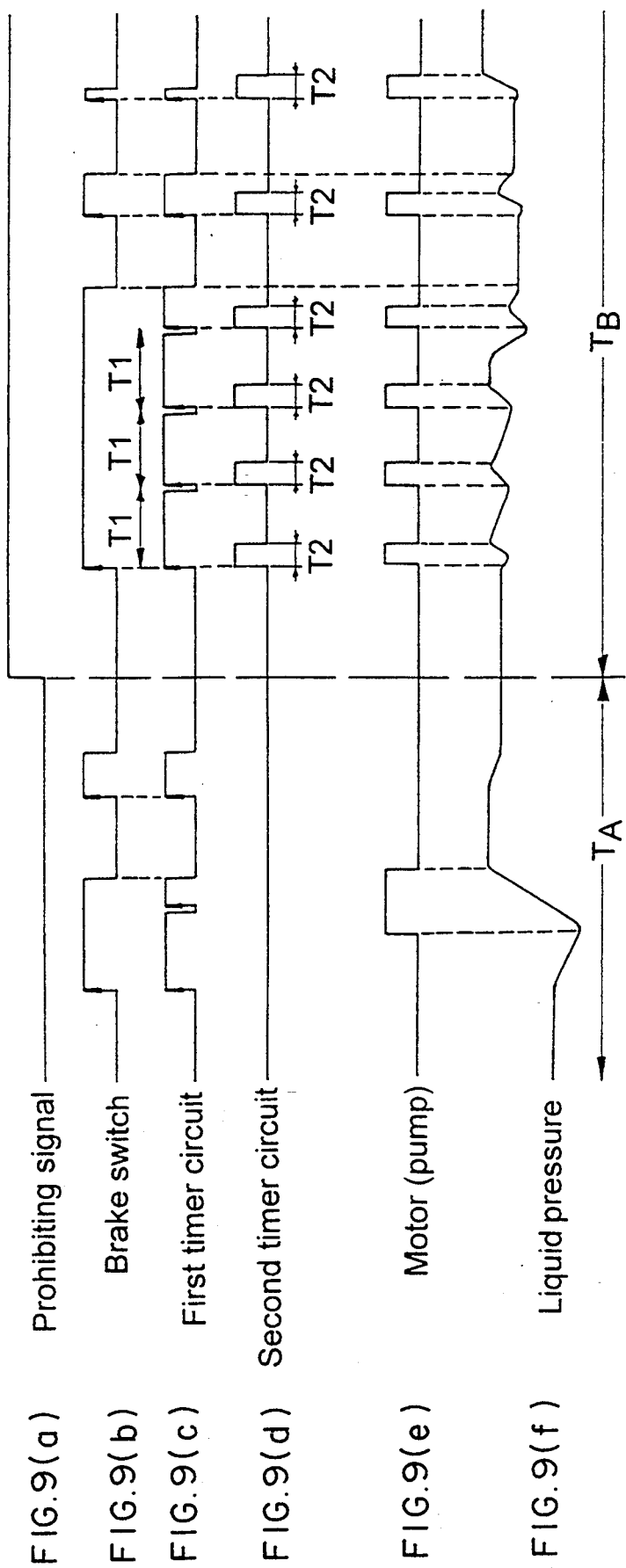
FIG. 9 is a timing chart for driving the pump.

The operation of the first embodiment will be described below with reference to FIG. 9. For a period $T_A$ in which a low level prohibiting signal is outputted from the prohibiting signal generating means 44 in a state in which the detected-pressure correspondence driving means 43 can output a driving signal, the output of the driving signal from the second timer circuit 52 in the consumed-pressure correspondence driving means 40 is prohibited, and the motor 8 and, thus, the liquid pump 9 are driven in response to the output of the driving signal from the detected-pressure correspondence driving means 43 in correspondence to the detection value detected by the pressure detector 11, thereby allowing the liquid pressure to be varied.

For a period $T_B$, in which the high level signal, from the prohibiting signal generating means 44, is received into the second timer circuit 52 in the consumed-pressure correspondence driving means 40 in a state in which there are no troubles in the central processing unit CPU itself, the power circuit 41 and the pressure detector 11 and in which the detected-pressure correspondence driving means 43 can output the driving signal, a high level signal, sustained for the preset time $T_2$, is outputted from the second timer circuit 52 in response to the output of a high level signal at every given period $T_1$ from the first timer circuit 51, during the braking operation, i.e., while the brake switch 33 is conducting. In response to this, the motor 8 and, thus, the liquid pump 9 are operated in an ON/OFF-repeated manner, so that the liquid pressure can be accumulated in the pressure tank 10 in accordance with the consumption of the liquid pressure.

Thus, if the operation of the liquid pump 9, based on the detection value detected by the pressure detector 11, is made impossible, due to troubles of the central processing unit CPU itself, the power circuit 41 and the pressure detector 11, then the liquid pump 9 can be driven by the consumed-pressure correspondence driving means 40 in accordance with the consumption of the liquid pressure corresponding to the braking operation, irrespective of the detection value detected by the pressure detector 11. Therefore, even if the operation of the liquid pump 9, based on the detection value detected by the pressure detector 11, is difficult, a sufficient liquid pressure can be insured by the pressure tank 10, and a reduction in brake assisting force can be prevented. Moreover, because the driving of the liquid pump 9 by the consumed-pressure correspondence driving means 40 is performed in the ON/OFF-repeated manner, the frequency of operation of the liquid pump 9 can be suppressed to the minimum even during a pumping braking with a driver's foot remaining on the brake pedal 1, thereby providing an enhanced reliability for supply of the liquid pressure to the control valve 4.

Further, a circuit including the detected-pressure correspondence driving means 43 and a circuit including the consumed-pressure correspondence driving means 40, excluding the connectors 36 and 38, are provided in parallel to each other, and the power circuits 41 and 42 are connected to the detected-pressure correspondence driving means 43 and the consumed-pressure correspondence driving means 40, respectively. Therefore, the reliability can be further enhanced by construction of these circuits into a completely double redundant circuit.

Figure 10:
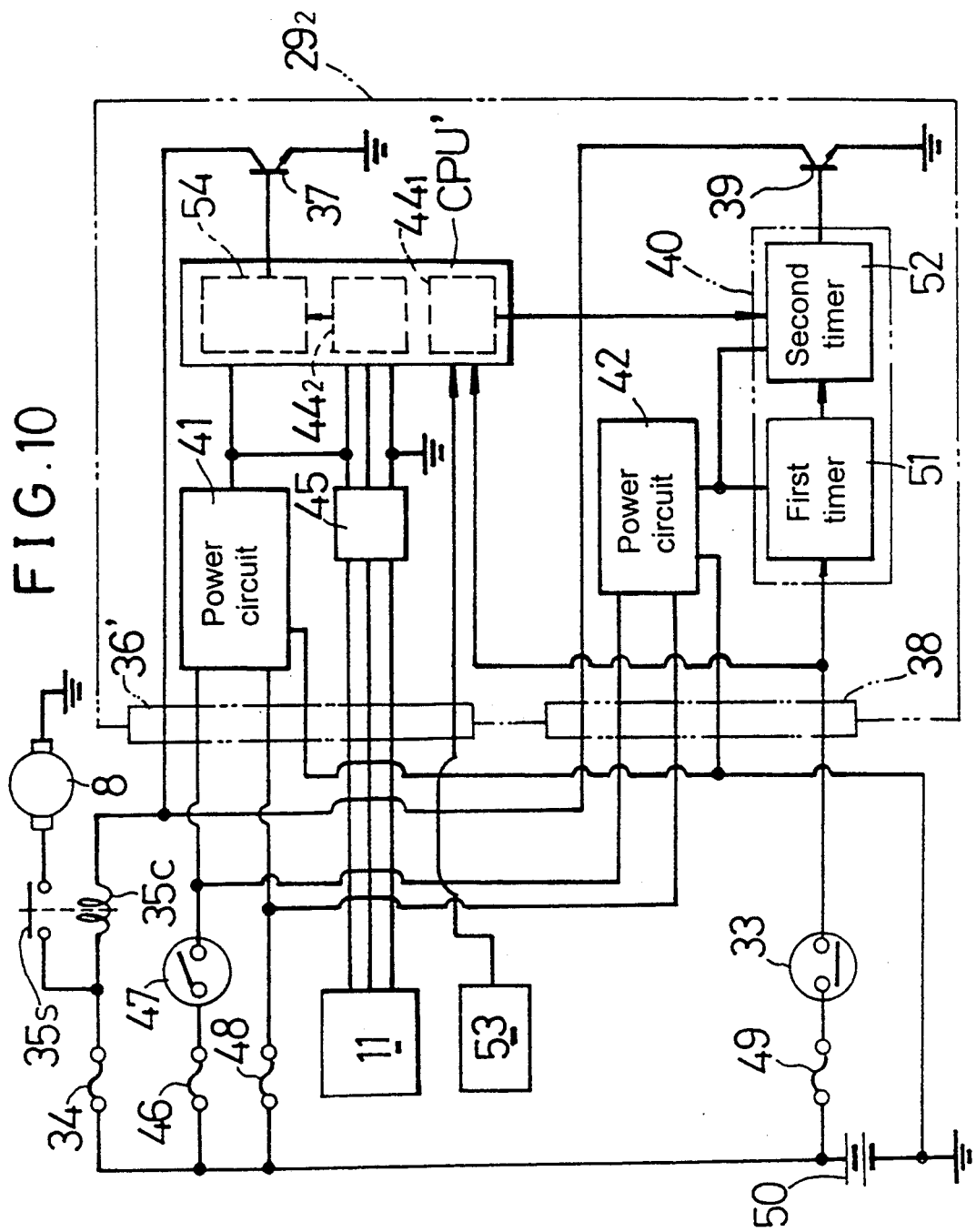
FIG. 10 is a diagram of an arrangement of a pump-operation control unit in a second embodiment.

FIG. 10 illustrates a pump-operation control unit according to a second embodiment of the present invention. The pump-operation control unit 292, for controlling the energization and deenergization of the relay coil 35c, includes a transistor 37 connected to the relay coil 35c, through a connector 36', a central processing unit CPU' for controlling the turn ON and OFF of the transistor 37, a transistor 39 connected to the relay coil 35c through a connector 38, a consumed-pressure correspondence driving means 40 for controlling the turn ON and OFF of the transistor 39, and power circuits 41 and 42 individually connected to the central processing unit CPU' and the consumed-pressure correspondence driving means 40.

The central processing unit CPU' has processing functions as a driving means 54 for controlling the turn ON and OFF of the transistor 37 to output a driving signal for driving the liquid pump 9, a prohibiting signal generating means $44_1$, for outputting a low level prohibiting signal for prohibiting the output of the driving signal from the second timer circuit 52 in the consumed-pressure correspondence driving means 40 in a state in which there are no troubles of the central processing unit CPU' itself and the power circuit 41 and in which the driving signal can be outputted from the driving means 54, and a normal-state detector $44_2$ for detecting whether or not the pressure detector 11 is in a normal operation. A detection signal, detected by the pressure detector 11, is applied from the connector 36' through a filter/buffer 45 into the central processing unit CPU', and the brake switch 33 is connected to the central processing unit CPU' through a connector 38. Further, a vehicle speed detector 53, as a motion parameter detecting means for detecting a vehicle speed V as a longitudinal vehicle motion parameter, is connected to the central processing unit CPU' through the connector 36'.

The prohibiting signal generating means $44_1$ has the same functions as the processing functions of the prohibiting signal generating means 44 in the first embodiment, but excluding the trouble judging function of the pressure detector 11. In a state in which there are no troubles of the central processing unit CPU' itself and the power circuit 41 and the like, a low level prohibiting signal is applied to the second timer circuit 52 in the consumed-pressure correspondence driving means 40 on the basis of the fact that the output of the driving signal from the driving means 54 is possible. The normal-state detector $44_2$ detects a normal state of the pressure detector 11 according to the procedure shown in FIGS. 3 to 9 in the previously-described first embodiment, and applies a high level signal to the driving means 54, when it is decided that the pressure detector is in the normal state.

The driving means 54 outputs a different driving signal, in response to the reception of the signal from the normal-state detector $44_2$, to control the turn ON and OFF of the transistor 37. When a low level signal is received into the driving means 54 from the normal-state detector $44_2$, because it is judged that the pressure detector 11 is in an abnormal state, a driving signal is outputted for driving the liquid pump 9 for a time $T_3$ determined on the basis of the vehicle speed V during braking. When a high level signal is received into the driving means 54 from the normal-state detector $44_2$, because it is judged that the pressure detector 11 is in the normal state, a driving signal is outputted for driving the liquid pump 9 on the basis of a detection value detected by the pressure detector 11.

The driving means 54 has a reap previously established therein, as shown in FIG. 11. This map is such that the driving time $T_3$ for the liquid pump 9 is determined in accordance with the deceleration $\alpha$ of the vehicle, wherein the driving time $T_3$ becomes gradually larger, as the deceleration $\alpha$ is larger, i.e., as the amount of liquid pressure consumed is larger due to application of a larger braking force. The deceleration $\alpha$ is determined according to the following equation: $\alpha = (V_{ON} - V_{OFF})/(t_{ON} - t_{OFF})$, wherein $V_{ON}$ and $t_{ON}$ represent a vehicle speed and a time point at the start of a braking operation, respectively, and $V_{OFF}$ and $t_{OFF}$ represent a vehicle speed and a time point at the end of the braking operation, respectively.

With the second embodiment, in a state in which it is decided by the normal-state detecting means $44_2$ that the pressure detector 11 is normal, the driving signal is outputted from the driving means 54 in accordance with the detection value detected by the pressure detector 11, thereby driving the liquid pump 9. On the other hand, if it is decided by the normal-state detecting means $44_2$ that the pressure detector 11 is abnormal, then the driving signal sustained for the driving time $T_3$, determined by the deceleration $\alpha$ is outputted from the driving means 54 at a time point when the braking operation is ended. Therefore, even if the pressure detector gets out of order, the pressure pump 9 can be operated in correspondence to the amount of liquid pressure consumed, thereby insuring a sufficient liquid pressure in the pressure tank 10 to prevent a reduction in brake assisting force.

Even if the driving of the liquid pump 9 by the driving means 54 is difficult, due to a trouble of the central processing unit CPU' itself, or due to a trouble of the power circuit 41 and the like, the liquid pump 9 can be driven by the consumed-pressure correspondence driving means 40 in accordance with the consumption of the liquid pressure corresponding to the brake operation, irrespective of the detection value detected by the pressure detector 11, as in the previously-described first embodiment. Thus, the frequency of operation of the liquid pump 9 can be suppressed to the minimum and, moreover, a sufficient liquid pressure can be insured by the pressure tank 10 to prevent a reduction in brake assisting force.

FIGS. 13 and 14 illustrate a modification to the second embodiment. The driving means 54 has a map previously established therein as shown in FIG. 13, in which the driving time $T_3$ for the liquid pump 9 is determined in accordance with the vehicle speed $V_{ON}$ at the start of a braking operation. During braking at a larger vehicle speed $V_{ON}$, a larger braking force is required, and the amount of liquid pressure consumed is larger. Therefore, in this map, the driving time $T_3$ is determined to be gradually larger, as the vehicle speed $V_{ON}$ is larger.

If it is decided by the normal-state detecting means $44_2$ that the pressure detector 11 is abnormal, a driving signal sustained for a driving time $T_3$ determined by a vehicle speed $V_{ON}$, is outputted from the driving means 54 at the start of a braking force. Even if the pressure detector 11 gets out of order, the liquid pump 9 can be operated in correspondence to the amount of liquid pressure consumed, thereby insuring a sufficient liquid pressure in the accumulator 10 to prevent a reduction in brake assisting force.

Although the embodiments of the present invention have been described in detail, it will be understood that the present invention is not limited to these embodiments, and various modifications in design can be made without departing from the spirit and scope of the invention defined in claims.

For example, the present invention can be applied to a negative pressure boosting type brake system comprising a liquid pump functioning as a negative pressure pump, and a pressure tank for storing a negative pressure therein instead of the described accumulator.

What is claimed is:

1. A fluid pressure boosting type brake system comprising a fluid pressure source including a fluid pump and a pressure tank connected to said pump, and a control valve capable of controlling an output pressure from said fluid pressure source to a fluid pressure corresponding to a degree of brake operation to output the same, wherein said system further includes a brake operation detecting means for detecting a brake operation, and a consumed-pressure correspondence driving means for outputting a driving signal indicative of a command to drive the fluid pump for each preset time for a predetermined period, while the degree of brake operation is detected by said brake operation detecting means.

2. A fluid pressure boosting type brake system according to claim 1, further including a pressure detector for detecting a fluid pressure in said pressure tank, a detected-pressure correspondence driving means provided in parallel to said consumed-pressure correspondence driving means and capable of outputting a driving signal indicative of a command to drive the fluid pump in accordance with a detection value detected by said pressure detector, and a prohibiting-signal outputting means for outputting a prohibiting signal indicative of a command to prohibit the output of said driving signal from said consumed-pressure correspondence driving means in a state in which said detected-pressure correspondence driving means can output the driving signal.

3. A fluid pressure boosting type brake system according to claim 2, further including power circuits individually connected to said consumed-pressure correspondence driving means and said detected-pressure correspondence driving means, respectively.

* * * * *